(12) United States Patent
Remo et al.

(10) Patent No.: US 8,826,804 B2
(45) Date of Patent: Sep. 9, 2014

(54) FILTER-HOLDER FOR COFFEE MACHINES WITH MEANS FOR ADJUSTING THE QUALITY OF THE COFFEE, AND A MACHINE COMPRISING SAID FILTER-HOLDER

(75) Inventors: Gianni Remo, San Marcello Pistoiese (IT); Marco Santoli, Porretta Terme (IT)

(73) Assignee: Koninklijke Philips N.V., Eindhoven (NL)

( * ) Notice: Subject to any disclaimer, the term of this patent is extended or adjusted under 35 U.S.C. 154(b) by 941 days.

(21) Appl. No.: 12/676,936

(22) PCT Filed: Sep. 11, 2008

(86) PCT No.: PCT/IT2008/000586
§ 371 (c)(1),
(2), (4) Date: May 27, 2010

(87) PCT Pub. No.: WO2009/040856
PCT Pub. Date: Apr. 2, 2009

(65) Prior Publication Data
US 2010/0236420 A1    Sep. 23, 2010

(30) Foreign Application Priority Data

Sep. 14, 2007  (IT) .................................. FI2007A0206

(51) Int. Cl.
A47J 31/06        (2006.01)

(52) U.S. Cl.
CPC .......... *A47J 31/0657* (2013.01); *A47J 31/0605* (2013.01)
USPC ........................... 99/299; 99/302 R; 99/323.1

(58) Field of Classification Search
USPC ............. 99/293, 295, 299, 302 R, 323, 323.1
See application file for complete search history.

(56) References Cited

U.S. PATENT DOCUMENTS

| 4,644,856 | A |  | 2/1987 | Borgmann |
| 4,882,982 | A |  | 11/1989 | Muttoni |
| 5,473,973 | A |  | 12/1995 | Cortese |
| 5,753,297 | A | * | 5/1998 | Schmed ........................ 426/595 |
| 6,382,083 | B2 |  | 5/2002 | Schmed |
| 6,412,394 | B2 | * | 7/2002 | Bonanno ......................... 99/299 |
| 6,711,988 | B1 | * | 3/2004 | Eugster ........................... 99/299 |
| 7,150,219 | B2 |  | 12/2006 | De'Longhi |
| 2008/0276807 | A1 |  | 11/2008 | Righetti |

FOREIGN PATENT DOCUMENTS

| DE | 19640170 B4 | 4/1998 |
| EP | 0726053 A1 | 8/1996 |
| EP | 0727164 A1 | 8/1996 |
| WO | 9116845 | 11/1991 |
| WO | 9739668 | 10/1997 |
| WO | 02091891 A1 | 11/2002 |
| WO | 060694 A1 | 5/2007 |

* cited by examiner

*Primary Examiner* — Reginald L Alexander

(57) ABSTRACT

A filter-holder for use in coffee machines, comprising: a cup in which a filter containing the coffee is inserted; at least one delivery spout; and a valve associated with the delivery spout for stabilizing the infusion back-pressure. The filter-holder also comprises a regulating device for adjusting the flow of coffee through the stabilizing valve so as to preset the organoleptic characteristics of the resulting beverage.

11 Claims, 6 Drawing Sheets

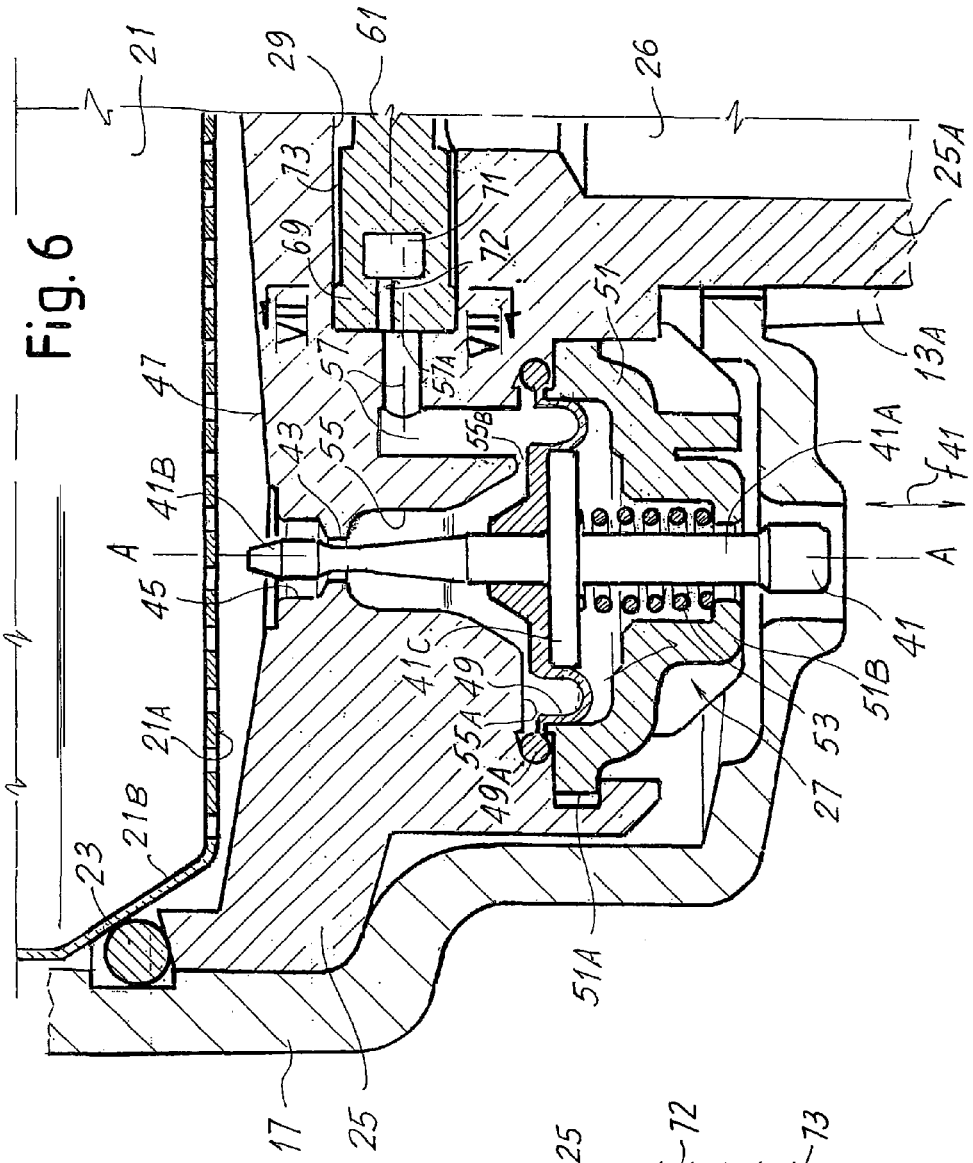

FILTER-HOLDER FOR COFFEE MACHINES WITH MEANS FOR ADJUSTING THE QUALITY OF THE COFFEE, AND A MACHINE COMPRISING SAID FILTER-HOLDER

TECHNICAL FIELD

The present invention relates to coffee-making machines. In particular, the present invention concerns coffee machines comprising a so-called filter-holder, i.e. a device usually comprising a handle or grip and a container for the coffee, in which a dose of coffee is inserted; the filter-holder is also provided with coupling means, typically of the bayonet or like type, for attaching the filter-holder underneath the hot water delivery unit in the coffee machine.

STATE OF THE ART

Many coffee machines, both for domestic and for professional uses; use a so-called filter-holder designed to contain a dose of coffee, that is attached to the machine in a position underneath the piping that delivers the hot water arriving from the boiler. The filter-holder comprises a cup containing a filter for the coffee and with one or two spouts underneath, through which the coffee is obtained by infusion from the ground coffee loaded and compressed above the filter contained in the cup. The cup is fitted with a handle or grip, and with coupling means, typically of the bayonet type, for attaching it to the coffee machine.

These filter-holders can be configured to use loose ground coffee or pre-packaged doses of coffee, e.g. in the form of cartridges, capsules or wafers. As will become clear below, the present invention can be applied to both types of filter holder, i.e. in those intended for use with loose ground coffee and in those designed for use with ground coffee pre-packaged in the form or wafers, capsules, cartridges or other types of packaging.

Examples of filter-holders and coffee machines that use such filter-holders are described in WO-A-02091891, DE-A-19640170, WO-A-9739668, WO-A-9116845, U.S. Pat. No. 4,644,856, EP-A-727164, U.S. Pat. Nos. 7,150,219, 5,473, 973, 4,882,982, and EP-A-726053.

In some filter-holders of known type, there is a simple connection pipe downstream from the filter that leads to the delivery spout(s) underneath. These filter-holders have the drawback that the quality of the coffee obtained is difficult to control and repeat. In fact, it is common knowledge that the coffee's organoleptic qualities depend heavily on the infusion conditions, and particularly on the rate at which the water filters through the compacted ground coffee inside the infusion chamber, which consists of the cup attached to the machine. A greater or lesser degree of compression of the ground coffee, a larger or smaller quantity of ground coffee inside the filter, a larger or smaller grinding grade, or a different moisture content of the ground coffee are all factors that can considerably modify the end result of the infusion process.

In order to avoid this drawback, some filter-holders are fitted with a valve for compensating the back-pressure, i.e. the pressure in the area where the coffee exits the infusion chamber, i.e. downstream from the filter. U.S. Pat. Nos. 4,882,982, 5,473,973 and WO-A-9116845 describe various types of valve for compensating the back-pressure, i.e. the pressure at which the coffee is discharged from the volume defining the infusion chamber inside the filter-holder. These valves are generally fitted with an element that closes the underside of the filter-holder cup and that is elastically compressed in said closed position so that it can open to enable the coffee to flow out when a given pressure is brought to bear thereon.

The device described in U.S. Pat. No. 4,882,982 has a shutter with a needle, associated with an elastic member, for modifying the cross-section of a coffee outlet lumen and controlling the infusion conditions.

A valve for compensating the pressure or back-pressure in an automatic coffee machine is described instead in U.S. Pat. No. 6,382,083. In this case, the valve is applied to the outlet pipe of an automatic infusion assembly. This known valve has proved particularly effective in controlling the flow of coffee during the infusion process.

The currently known types of filter-holder, even those equipped with a back-pressure compensating valve, do not enable the user to adjust the organoleptic characteristics of the coffee. In other words, they do not allow the user to readily obtain a stronger or weaker coffee, e.g. a short espresso, a long espresso or an American-style coffee.

SUMMARY OF THE INVENTION

According to one aspect, object of the present invention is to improve the filter-holders for coffee machines of known type and to alleviate, or to entirely or partially eliminate at least some of the above-mentioned drawbacks.

In-short, the invention concerns a filter-holder provided with a valve for stabilising or compensating the infusion back-pressure, said filter-holder also comprising a regulating device for modifying the value of the back-pressure at which the pressure stabilising valve operates. By means of the regulating device, the user can thus modify the infusion conditions in order to obtain a more or less concentrated, or a more or less diluted coffee.

In one embodiment, the regulating device comprises a coffee outlet orifice in communication with the pressure stabilising valve and with the delivery spout, and an adjustable shutter element for modifying the cross-section of the passage through said orifice.

The cross-section of the passage through the orifice can be adjusted by means of a stem member that is regulated by means of a screwing action. Said adjustment is preferably achieved by means of a shutter element that is shaped so as to modify the cross-section of the passage for the flow by means of its rotation around a regulating axis.

In one embodiment of the invention, the pressure stabilising valve comprises: an inlet that places the inside of the cup in fluid communication with a pressure compensating chamber; an outlet that places the pressure compensating chamber in communication with an outlet orifice; and wherein said pressure compensating chamber comprises an elastic member associated with a member for throttling the inlet to modify the cross-section of the passage through said opening.

In a particularly advantageous embodiment of the invention, the filter-holder comprises—in a basically known manner—a handle or grip attached to the cup and the regulating device extends along said grip, and preferably in a seat inside it. It may have operating means, e.g. in the form of a knob, a nut or the like, applied to the grip, and preferably at the opposite end of the grip with respect to the cup.

This does not rule out the possibility of said operating means being arranged in an intermediate position along the length of the grip, or directly in the vicinity of the cup containing .the filter, but operating means situated at the free end of the grip are more straightforward to manufacture and easier and more practical to use, as well as being less liable to the effect of heating due to the passage of the hot water through the infusion chamber.

In some embodiments, the regulating device may include a stem suitable for screwing inside a seat provided in the grip. In a preferred embodiment, the regulating device is a stem that extends inside and approximately parallel to the grip. A first end of the stem is preferably associated with the operating means and a second end of the stem is associated with a member that modifies the cross-section of the orifice enabling the passage of the coffee downstream from the pressure stabilising valve.

In some embodiments, the stem is elastically loaded in the axial direction and is designed to be rotated around its own axis to adjust the cross-section of the passage through the orifice.

The stem may comprise a perforated body consisting, for instance, of the terminal enlargement of the stem, defining a path for the flow of coffee, with an inlet and an outlet. This perforated body is made so that its movement, e.g. its rotation around an axis, modifies the cross-section of the orifice for the passage of the coffee. In one possible embodiment, the inlet of the perforated body is in fluid communication with the orifice for the passage of the coffee downstream from the pressure stabilising valve, so that the relative positions of the orifice and the inlet to the perforated body can be modified to vary the cross-section of the passage through said orifice.

According to another aspect, the invention also concerns a coffee machine comprising a filter-holder as described above.

BRIEF DESCRIPTION OF THE DRAWINGS

The invention will be better clarified in the following description and attached drawings, which show a non-limiting practical embodiment of the invention. More in particular, in the drawings:

FIG. 6 is an enlargement of the detail in FIG. 5; and

FIG. 7 is a cross-section along VII-VII in FIG. 6.

DETAILED DESCRIPTION OF AN EMBODIMENT OF THE INVENTION

The present invention is described below in connection to its application to a domestic coffee machine that uses loose ground coffee. As mentioned earlier, however, the present invention can also be applied to professional coffee machines and even to either professional or domestic coffee machines that rely on the use of pods, capsules, cartridges or other containers of pre-packaged doses of ground coffee. In this case, the filter holder may include a system (in a basically known manner) for perforating the capsule, pod, cartridge or other type of packaging, when this is required by the type of packaging involved.

Figure 1:
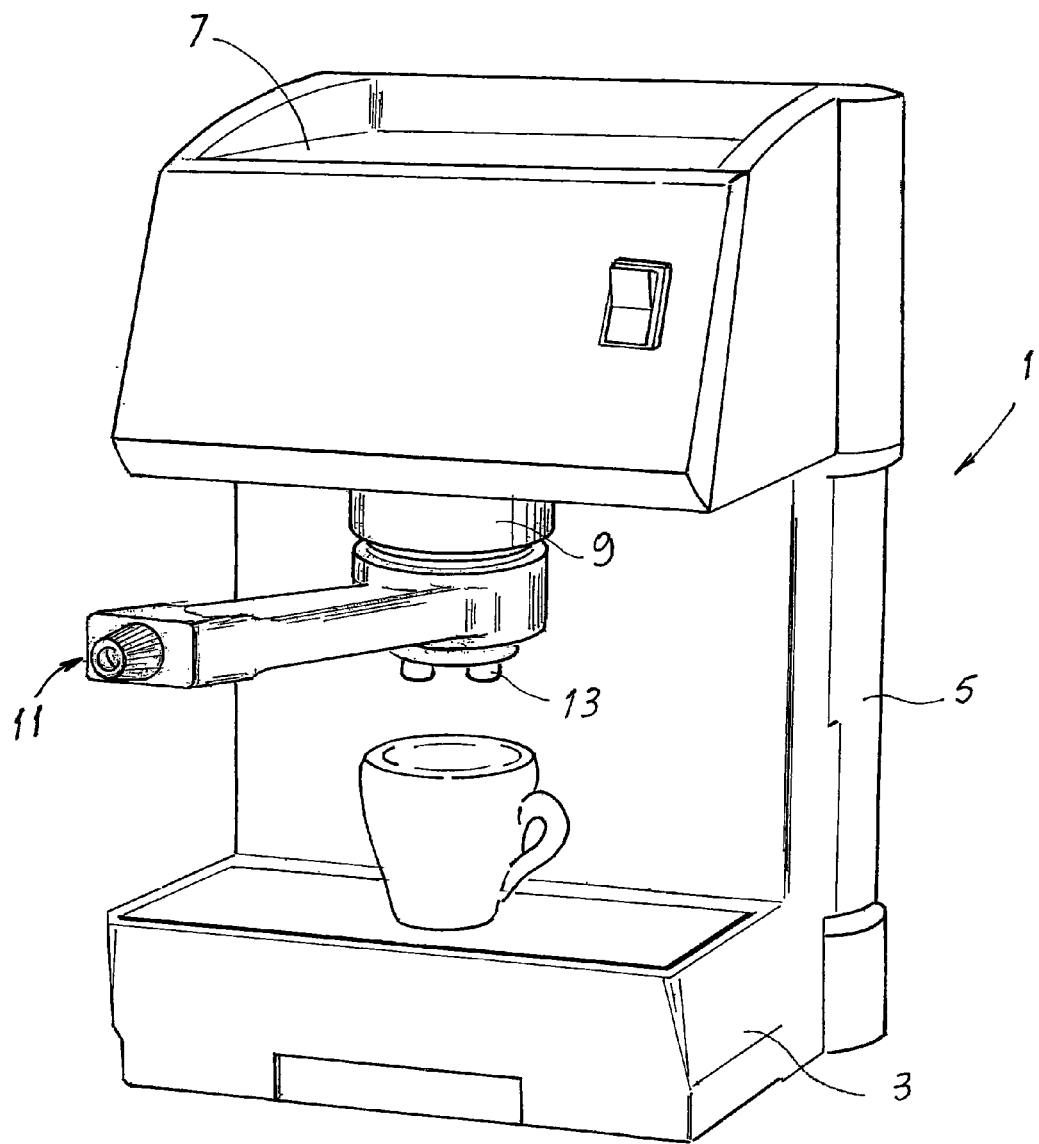
FIG. 1 shows a coffee machine for domestic use to which the invention can be applied.

The machine in FIG. 1, globally indicated by the numeral 1, comprises a base 3 with an upright 5 that supports an upper portion 7, under which a coupling 9 is provide for attaching a filter-holder, globally indicated by the numeral 11, with a delivery spout 13 and bayonet-type coupling means for its attachment to the machine 1.

Figure 2:
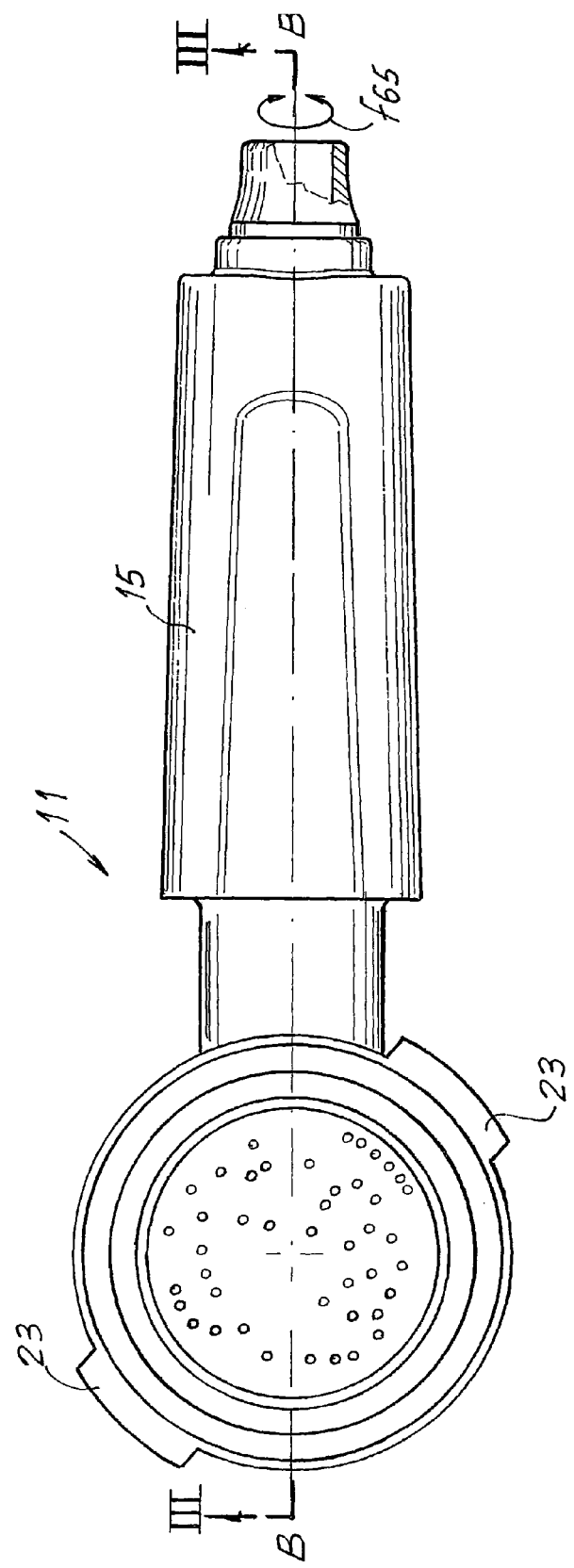
FIG. 2 shows a view from above of the filter-holder according to the invention.
Figure 3:
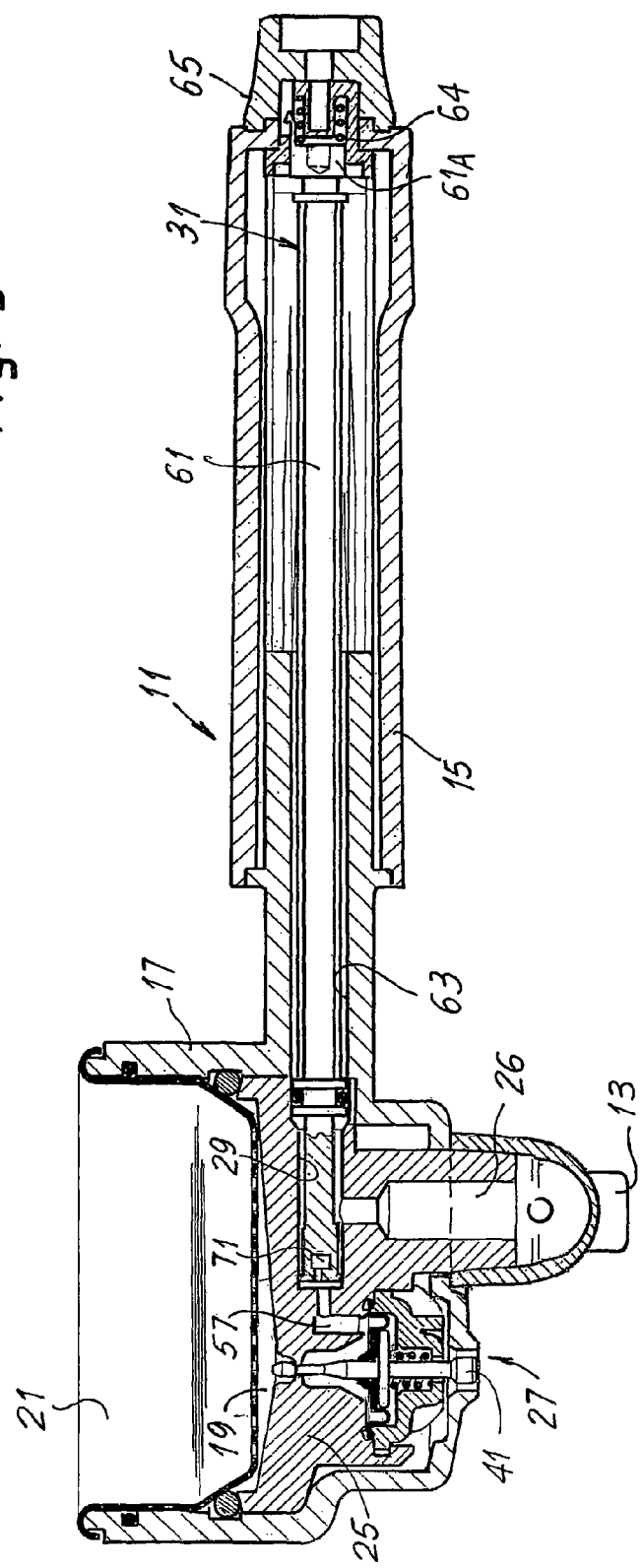
FIG. 3 shows a longitudinal cross-section along III-III in FIG. 2.

The filter-holder 11 as a whole is shown in more detail in FIGS. 2 and 3. It has a handle or grip 15, which is integrally attached to a cup 17, which forms a recess 19 in which a filter 21 is inserted. The filter 21 contains the ground coffee from which the beverage is obtained by extracting the flavour contained in the ground coffee by passing hot water under pressure through it.

When the cup 17 is coupled to the coffee machine 1 by means of the bayonet coupling 23, it forms an infusion chamber, in which the flavours contained in the ground coffee are, extracted by means of the hot water flowing under pressure through the ground coffee compressed inside the filter 21.

In one embodiment, the filter 21 has a perforated bottom 21A, surrounded by a truncated-cone-shaped wall 21B that provides a watertight seal against a sealing ring or O-ring 23.

In one embodiment, a block 25 is provided in the lower part of the cup 17 that constitutes the body of a back-pressure stabilising valve, globally indicated by the numeral 27 and described in more detail later on. Said block 25 also contains a duct 26 in communication with the delivery spout 13, and a seat 29 for an adjustable shutter element of a back-pressure regulating device globally indicated as 31, described in more detail later on, that extends at least partially through the inside of the grip 15.

The block 25 has an externally threaded appendage 25A through which the passage or duct 26 extends. Said appendage 25A extends underneath the cup 17 through an opening 17A and the spout 13 that, for said purpose, has a threaded body 13A for instance, is screwed onto the threading on the appendage 25A. The block 25 is thereby removably fixed inside the cup 17.

The back-pressure stabilising valve 27 can be made in a known manner. In one particularly advantageous embodiment of the invention, said valve has the structural design and functions of the valve described in U.S. Pat. No. 6,382,083, the content of which is entirely incorporated herein and forms an integral part of the present description, and is intended as entirely transcribed here.

The purpose of the valve 27 is to stabilise the pressure at the infusion chamber outlet, i.e. the infusion back-pressure. As explained briefly below, the valve comprises a stem or needle that modifies the cross-section of the passage through the first opening for the flow of coffee coming from the filter 21. The movement of this needle is controlled by the flow of coffee so as to keep the back-pressure constant, i.e. stable, and consequently obtain a reproducible coffee quality irrespective of the effect of various parameters, such as the grinding grade of the ground coffee, the degree to which it is compressed inside the filter 21, and so on. As explained below, the pressure or back-pressure at which the valve 27 operates can be adjusted and pre-set by the user by means of the regulating device 31, which gives the filter-holder an additional function.

Briefly, referring the reader to U.S. Pat. No. 6,382,083 for a more detailed description of its operation and structural design, the valve 27 comprises a rigid member 41 extending along an axis A-A of the valve and constituting the means for throttling, i.e. partially closing, the opening 43 through which the coffee produced in the filter 21 flows towards the delivery spout 13. In one embodiment, the opening 43 is created in the block 25 contained inside the bottom of the cup 17. In another embodiment, the opening 43 is created in the bottom of a trap 45 (FIG. 6) obtained in the block 25. The trap 45 can be advantageously surrounded by a sloping surface 47 for collecting the coffee, again forming part of the block 25 and located underneath the bottom 21A of the filter 21 to facilitate the drainage of the coffee into the opening 43.

The rigid member 41 comprises a stem 41A terminating with a shaped end 41B for throttling the opening 43. In an intermediate portion along the longitudinal length of the stem 41A, the rigid member 41 includes a plate 41C. In line with said plate 41C the rigid member 41 is connected to an elastic membrane 49 with a substantially circular shape, with an intermediate curved area that makes it easily deformable as a result of a movement of the rigid member 41 in the direction of f41. The edge 49A of the membrane 49 is locked between the body of the valve 27, defined inside the block 25, and a cap 51 that is locked against the body of the valve by means of a bayonet coupling 51A, or other suitable means.

Numeral 51B designates a raised, internally hollow central portion of the cap 51, containing a compression spring 53 that pushes against the plate 41C on the rigid member 41 to move said plate into a maximally raised position, corresponding to the fully-opened state of the opening 43.

Inside the block 25, there is a cavity 55, preferably coaxial to the opening 43, in which the stem 41A of the rigid member 41 extends. The cavity 55 terminates with a substantially ring-shaped edge 55A, along which a passage 55B is provided connecting said cavity 55 to a channel 57 for discharging the coffee. The channel 57 is connected (by means of a shutter element described later on, which forms part of the regulating device 31) to the duct 26 for the passage of the coffee towards the delivery spout 13 and defines an orifice 57A with a cross-section that is adjustable by means of the regulating device 31, as described in more detail below.

The operation of the valve 27 briefly described above is as follows. When the filter-holder containing the compacted ground coffee is attached to the coffee machine and the hot water is delivered, the coffee comes out of the filter 21 and flows into the trap 45 and then through the opening 43 into the cavity 55, and from there through the passage 55B into the channel 57, so that it can emerge through the delivery spout 13. The water is fed into the filter-holder under a certain positive pressure, typically coming between 10 and 17 bar. Because of the pressure drop; or load loss, through the compacted ground coffee inside the filter 21, in the space downstream from the filter coming between the perforated bottom 21A and the surface 47 there will be a pressure, or back-pressure, that is lower than the pressure of the water arriving from the boiler. The back-pressure downstream from the filter 21 is typically around 7 bar, but this value may vary and is set by the user in a manner described later on. The valve 27 keeps said back-pressure stable at a value that can be adjusted by the user.

The back-pressure is stabilised as follows. The coffee that flows through the filter 21 collects in the trap 45 and flows through the opening 43 to fill the cavity 55, the pressure exerted by the coffee coming to bear on the elastic membrane 49 and thereby loading the compression spring 53. If the flow rate of the coffee is higher than the nominal flow rate, and the back-pressure is consequently insufficient, the flow of coffee compresses the spring 53 inducing a consequent downward displacement of the stem 41A and a related gradual closure, or throttling, of the opening 43 by the shaped end 41B. This gives rise to an increase in the back-pressure downstream from the filter 21 on the one hand, and on the other to a reduction in the flow rate and a consequent tendency of the cavity 55 to be emptied through the passage or opening 55B, with a gradual return of the stem 41A to its original position. The equilibrium between the pressure involved and the force of the spring 53, which is influenced by the flow rate of the coffee coming from the valve, thus maintains the back-pressure downstream from the filter 21 as required and pre-set by the user.

The flow of coffee through the opening 55B in the chamber 55 depends on the flow conditions downstream from the channel 57. The regulating device 31 described herein serves the purpose of enabling the user to modify these flow conditions, within a certain range of operation, in order to increase or reduce the coffee's flow rate through the valve 27 and thereby modify the organoleptic characteristics of the resulting beverage.

Figure 4:
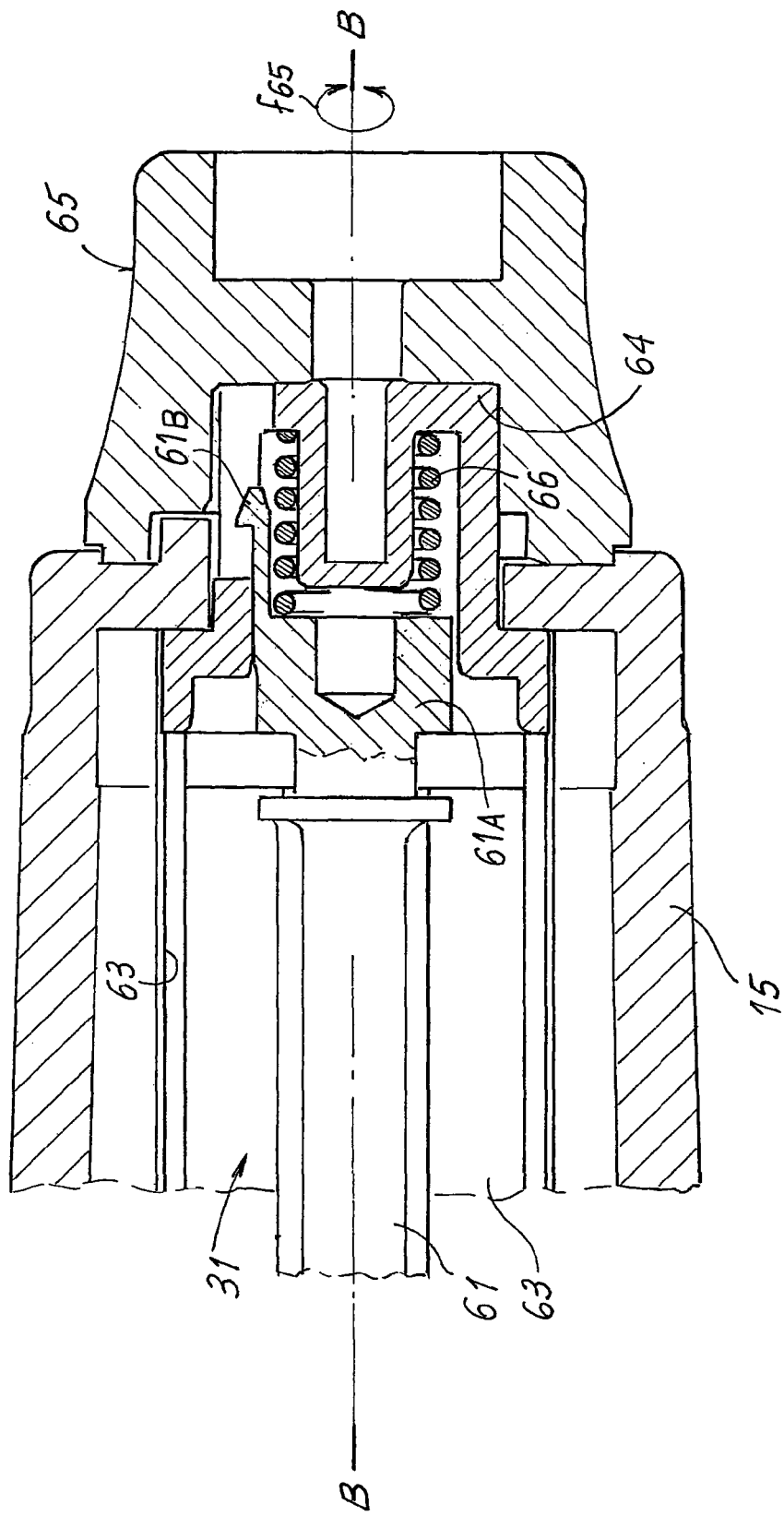
FIGS. 4 and 5 are enlargements of the cross-section in FIG. 3.
Figure 5:
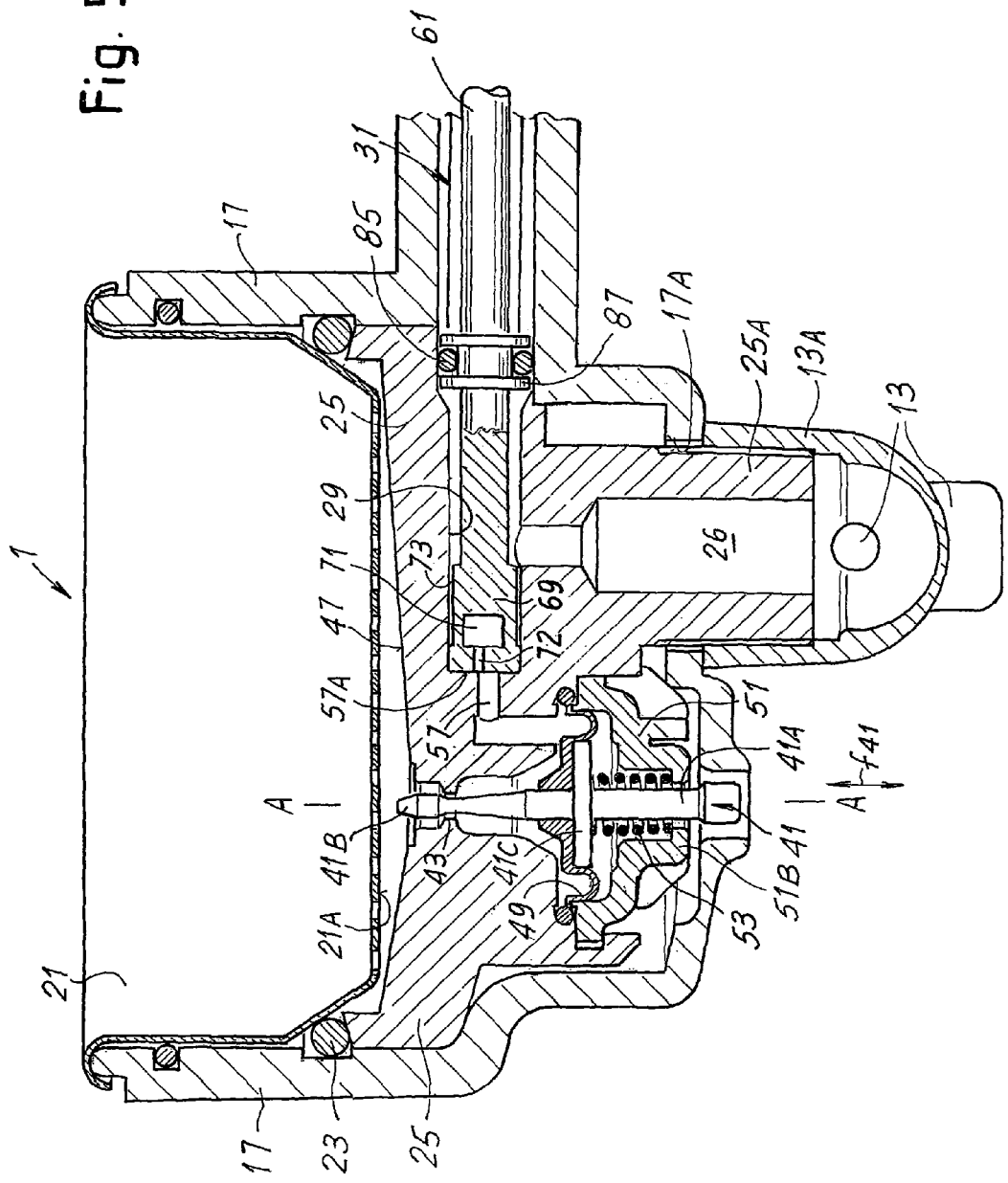

The regulating device 31 comprises a rod 61 that extends longitudinally inside a seat 63 provided in the handle or grip 15. At the opposite end from the cup 17, the rod 61 is associated with operating means 65 in the form of a knob. Rotation of the knob 65 in the direction of the double arrow f65 around the axis B-B of the handle or grip 15 induces a corresponding rotation of the rod 61 around its axis. The rod 61 includes an expanded portion 61A (FIG. 4) with flexible teeth 61B that engage by mechanical interference in grooves provided in a body 64 that retains the rod inside the grip 15. This arrangement is such that the rod 61 can slide axially to a limited degree inside its seat in the grip 15 as a result of the teeth 61B sliding within the grooves in the body 64. The latter is torsionally coupled to the knob 65, so that any rotation of the knob 65 in the direction f65 (FIG. 4) around the axis of the rod 61 induces a rotation of said rod.

Between the body 64 and the expanded portion 61A of the rod, there is a compression spring 66 that pushes the rod 61 towards the cup 17.

The end of the rod 61 opposite to the expanded portion 61A is associated with a regulating member or shutter of the stretch of passage through the orifice 57A defined by the terminal portion of the channel 57 on the side of the seat 29. The regulating member or shutter, identified as 69, consists essentially of an expanded portion of the rod that is contained inside the seat 29. The expanded portion 69 has a passage 71 that places the channel 57 in communication with a ring-shaped passage 73 created between the inner surface of the seat 29 and the outer surface of a portion of the expanded portion 69.

The passage 71 is in fluid communication with a slot 72 that opens onto the front surface of the expanded portion 69. This slot lies opposite the orifice 57A and the mutual positioning of this slot 72 and the orifice 57A is such that the cross-section for the passage of the fluid depends on these two elements and varies with the rotation of the rod 61 (which is integral with the slot 22) around the axis B-B of the rod 61. In other words, the slot 72 is off-centre with respect to the channel 57, so that the cross-section of the flow through the orifice 57A can be varied by rotating the rod 61 around its axis B-B.

The ring-shaped passage 73 is in direct fluid communication with the duct 26 and consequently with the delivery spout 13.

Rotating the rod 61 around its own axis makes the slot 72, which is off-centre with respect to the channel 57 and the orifice 57A, come to occupy a variable position with respect to the latter, increasing or decreasing the cross section of the passage for the coffee through said orifice. This cross section can thus be modified to adjust the flow rate of the coffee coming from the stabilising valve 27. Setting the angular position of the rod 61 so as to reduce the cross-section of the passage through the orifice 57A to a minimum will also reduce to a minimum the flow rate of the coffee coming through the valve 27. As a result, the flow rate through the valve 27 can be adjusted to obtain a more concentrated or a more heavy coffee. When the cross-section of the passage through the orifice 57A is gradually increased by rotating the rod 61, the coffee passes more rapidly through the cavity 55 in the valve 27 and consequently results in a less concentrated, i.e. a more diluted, coffee being delivered from the filter holder.

In other words, together with the rod 61, the regulating device 31 enables the user to modify the organoleptic characteristics of the beverage at will by means of a simple adjustment of the knob 65, which varies the delivery flow rate through the regulating valve 27.

To guarantee a seal between the front surface of the expanded portion 69 of the rod 61 and the terminal surface of the seat 29 created in the block 25, the rod 61 is elastically loaded in the axial direction by a compression spring 66, which is retained in a partially-compressed position between the body 64 and the expanded portion 61A of the rod 61. The body 64 juxtaposes against an abutment 15A on the grip 15 and the compressive force of the spring 66 consequently pushes the rod 61 towards the cup 17, so that the front surface of the expanded portion 69 presses and forms a watertight seal against the end of the seat 29. An elastic ring or sealing O-ring 85 is contained in a ring-shaped seat 87 provided in an intermediate portion of the rod 61 to prevent the coffee from flowing along the surface of the rod 61 into the grip or handle 15.

Clearly, the drawings show just one embodiment of the invention, which may be modified in form and layout without departing from the scope of the concept behind the invention.

The invention claimed is:

1. A filter-holder for coffee machines, comprising:
   a cup in which a coffee filter is inserted;
   at least one delivery spout;
   associated with said delivery spout, a valve for stabilizing the infusion back-pressure;
   a passage coupled between the valve and said delivery spout; and
   a regulating device downstream between the valve and the at least one delivery spout for modifying the flow rate of the coffee coming from the stabilizing valve by modifying a cross section of at least a portion of the passage.

2. The filter-holder according to claim 1, wherein said cup contains a block comprising: a body of the back-pressure stabilizing valve, an orifice including a seat, positioned within the passage, and the regulating device comprising a shutter element, wherein the regulating device is configured to modify the cross-section of the passage by modifying a position of the shutter element relative to the seat.

3. A coffee machine comprising a filter-holder according to claim 1.

4. A filter-holder for coffee machines, comprising:
   a cup in which a coffee filter is inserted;
   at least one delivery spout;
   associated with said delivery spout, a valve for stabilizing the infusion back-pressure; and
   a regulating device for modifying the flow rate of the coffee coming from the stabilizing valve, wherein said regulating device comprises an adjustable shutter element for modifying the cross-section of an orifice for the delivery of the coffee positioned between said valve and said delivery spout.

5. The filter holder according to claim 4, wherein said pressure stabilizing valve comprises:
   an inlet that places the inside of said cup in fluid communication with a pressure compensating chamber; and
   an outlet that places the pressure compensating chamber in communication with said outlet orifice, wherein said pressure compensating chamber comprises an elastic member associated with means for throttling the inlet in order to modify the cross-section of said inlet.

6. A filter-holder for coffee machines, comprising:
   a cup in which a coffee filter is inserted;
   at least one delivery spout;
   associated with said delivery spout, a valve for stabilizing the infusion back-pressure;
   a regulating device for modifying the flow rate of the coffee coming from the stabilizing valve; and
   a grip attached to said cup, wherein said regulating device extends along said grip and includes operating means attached to said grip.

7. The filter-holder according to claim 6, wherein said regulating device extends inside a longitudinal seat within a grip.

8. The filter-holder according to claim 6, wherein said operating means are attached to the opposite end of said grip with respect to said cup.

9. The filter-holder according to claim 6, wherein said regulating device comprises a rod extending approximately parallel to said grip, a first end of which is associated with said operating means and the second end of which is associated with an element for adjusting the cross-section of said orifice for the delivery of the coffee, located between the pressure stabilizing valve and the delivery spout.

10. The filter-holder according to claim 9, wherein said rod is elastically loaded in the axial direction and is capable of rotation around its own axis to modify said cross section of the outlet orifice arranged between the pressure stabilizing valve and the delivery spout.

11. A filter-holder for coffee machines, comprising:
    a cup in which a coffee filter is inserted;
    at least one delivery spout;
    associated with said delivery spout, a valve for stabilizing the infusion back-pressure;
    a regulating device for modifying the flow rate of the coffee coming from the stabilizing valve, said regulating device including a perforated body defining a path for the flow of coffee, with an inlet and an outlet, and that said inlet is in fluid communication with said orifice, the respective positions of said orifice and said inlet being adjustable so as to modify the cross section of said orifice.

* * * * *